(12) United States Patent
McKimson

(10) Patent No.: US 7,445,233 B2
(45) Date of Patent: Nov. 4, 2008

(54) GUIDING PILLAR TRIM FOR A SIDE-CURTAIN AIRBAG SYSTEM

(75) Inventor: David McKimson, Lake Orion, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 263 days.

(21) Appl. No.: 10/711,504

(22) Filed: Sep. 22, 2004

(65) Prior Publication Data

US 2006/0061069 A1    Mar. 23, 2006

(51) Int. Cl.
*B60R 21/213* (2006.01)
*B60R 21/215* (2006.01)

(52) U.S. Cl. ............. 280/730.2; 280/728.3; 280/728.2; 296/1.08

(58) Field of Classification Search .............. 280/730.2, 280/728.2, 728.3, 728.1, 748; 296/1.08, 296/1.04; 52/716.14, 716.1
See application file for complete search history.

(56) References Cited

U.S. PATENT DOCUMENTS

| | | | | |
|---|---|---|---|---|
| 5,899,528 A | * | 5/1999 | Rumpf et al. | 297/216.13 |
| 6,152,482 A | * | 11/2000 | Patel et al. | 280/730.2 |
| 6,254,123 B1 | * | 7/2001 | Urushi et al. | 280/730.2 |
| 6,305,707 B1 | * | 10/2001 | Ishiyama et al. | 280/728.2 |
| 6,361,069 B1 | * | 3/2002 | Saito et al. | 280/730.2 |
| 6,382,660 B1 | * | 5/2002 | Starner et al. | 280/728.2 |
| 6,530,594 B1 | * | 3/2003 | Nakajima et al. | 280/730.2 |
| 6,672,027 B2 | * | 1/2004 | Mizutani et al. | 52/16.5 |
| 6,808,198 B2 | * | 10/2004 | Schneider et al. | 280/730.1 |
| 2004/0075250 A1 | * | 4/2004 | Choi | 280/728.3 |
| 2004/0178609 A1 | * | 9/2004 | Totsuka et al. | 280/730.2 |
| 2004/0227334 A1 | * | 11/2004 | Chausset | 280/730.2 |
| 2006/0220356 A1 | * | 10/2006 | Baekelandt | 280/730.2 |

FOREIGN PATENT DOCUMENTS

| | | | |
|---|---|---|---|
| EP | 1 038 736 | * | 9/2000 |
| JP | 410138858 | * | 5/1998 |
| JP | 2000255370 | * | 9/2000 |

* cited by examiner

*Primary Examiner*—Lesley D. Morris
*Assistant Examiner*—George D. Spisich
(74) *Attorney, Agent, or Firm*—Earl LaFontaine

(57) ABSTRACT

A guiding pillar trim (14) for a side-curtain airbag system (12) of a vehicle (10) is provided. The guiding pillar trim (14) includes a panel (44) for covering a vehicle body structure (10). This panel (44) has a guide member (54) coupled thereto that is movable between a trim configuration and a ramp configuration. In the ramp configuration, the guide member (54) directs the deployment of a side-curtain airbag (34) in a predetermined direction.

15 Claims, 3 Drawing Sheets

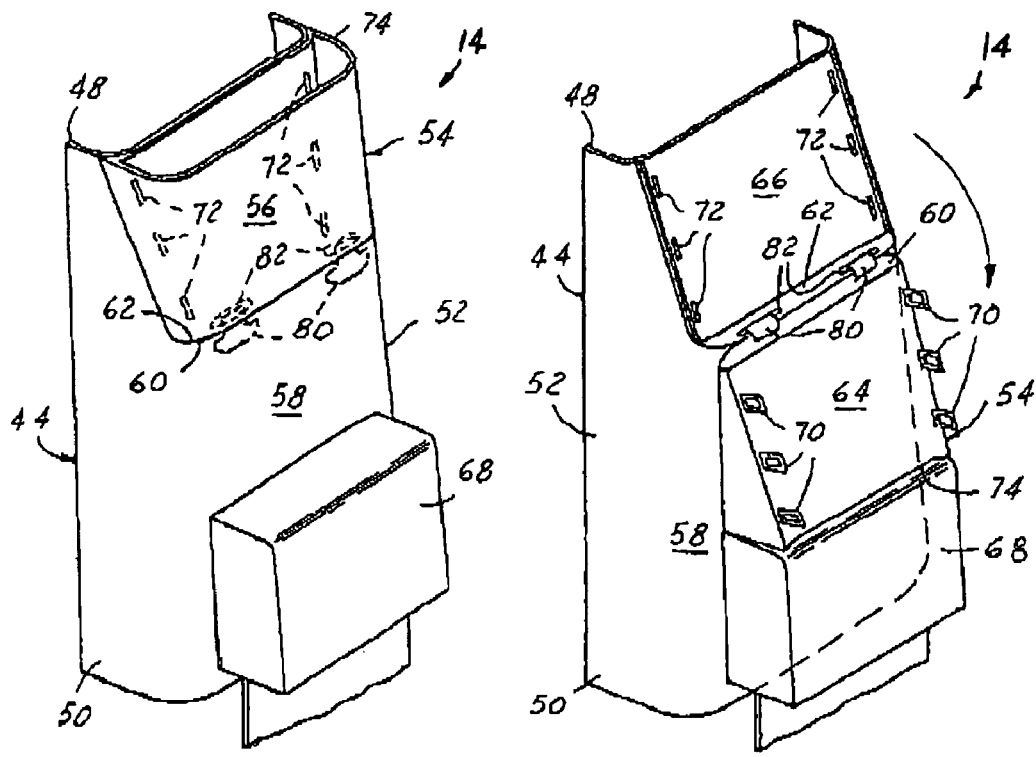
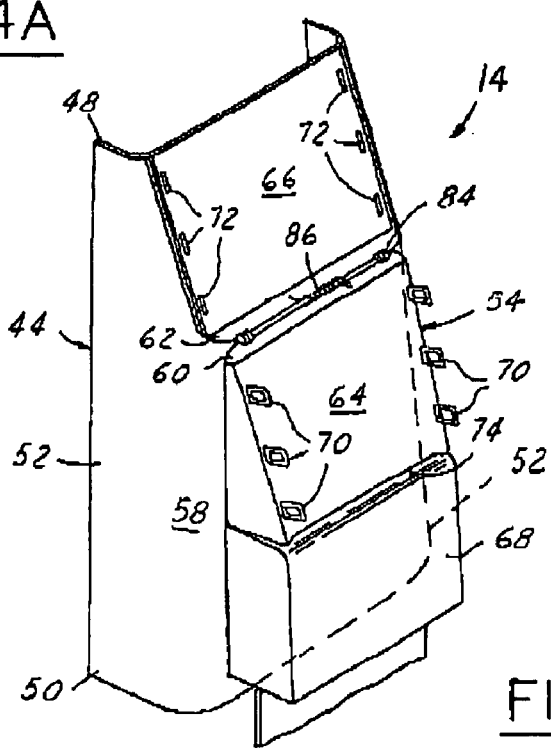
FIG. 4A
FIG. 4B
FIG. 5

GUIDING PILLAR TRIM FOR A SIDE-CURTAIN AIRBAG SYSTEM

TECHNICAL FIELD

The present invention relates generally to side-curtain airbag systems, and more particularly to a side-curtain airbag system having a guiding pillar trim for directing the deployment of a side-curtain airbag in a predetermined direction.

BACKGROUND OF THE INVENTION

Side-curtain airbag systems for vehicles are well known. These systems typically are utilized for absorbing side-impact forces that could otherwise have been imparted upon a vehicle occupant's head and/or upper body. A typical side-curtain airbag system includes a crash sensor, an inflator device coupled to and actuated by the crash sensor, and a side-curtain airbag coupled to and inflated by the inflator device. The side-curtain airbag typically is stored within the headliner of the vehicle roof and deployed downward from that headliner.

It would therefore be desirable to provide a guiding pillar trim for directing the deployment of the side curtain airbag in a predetermined direction for providing substantial protection for the vehicle occupant.

SUMMARY OF THE INVENTION

In one advantageous embodiment of the claimed invention, a guiding pillar trim for a side-curtain airbag system of a vehicle is provided. The guiding pillar trim includes a panel for covering a pillar structure of the vehicle. This panel has a guide member coupled thereto that is movable between a trim configuration and a ramp configuration. In the ramp configuration, the guide member directs the deployment of a side-curtain airbag in a predetermined direction.

One advantage of the present invention is that a guiding pillar trim for a side-curtain airbag system of a vehicle is provided that improves deployment of side-curtain airbags so as to enhance protection of the head and upper body of vehicle occupants in a side-impact collision and/or roll-over event.

Another advantage of the present invention is that a guiding pillar trim for a side-curtain airbag system of a vehicle is provided that has a substantially simple construction with few components for minimizing subassembly time and costs associated therewith.

Yet another advantage of the present invention is that a guiding pillar trim for a side-curtain airbag system of a vehicle is provided that has a substantially lightweight construction for maximizing the fuel economy of the vehicle.

Still another advantage of the present invention is that a guiding pillar trim for a side-curtain airbag system of a vehicle is provided that has a substantially compact construction for preserving the available space within a vehicle.

Yet another advantage of the present invention is that a guiding pillar trim for a side-curtain airbag system of a vehicle is provided that has a versatile construction for providing a uniform interior vehicle design while directing the deployment of the side-curtain airbag in a crash event.

Other advantages of the present invention will become apparent when viewed in light of the detailed description of the invention when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention:

FIG. 4A is a perspective view of the guiding pillar trim shown in FIG. 2A, illustrating the guiding pillar trim in the trim configuration;

FIG. 4B is a perspective view of the guiding pillar trim shown in FIG. 2B, illustrating the guiding pillar trim moved to the ramp configuration; and FIG. 5 is a perspective view of the guiding pillar trim shown in FIG. 4B, illustrating the guiding pillar trim moved to the ramp configuration, according to another advantageous embodiment of the claimed invention.

DETAILED DESCRIPTION OF THE INVENTION

Figure 1:
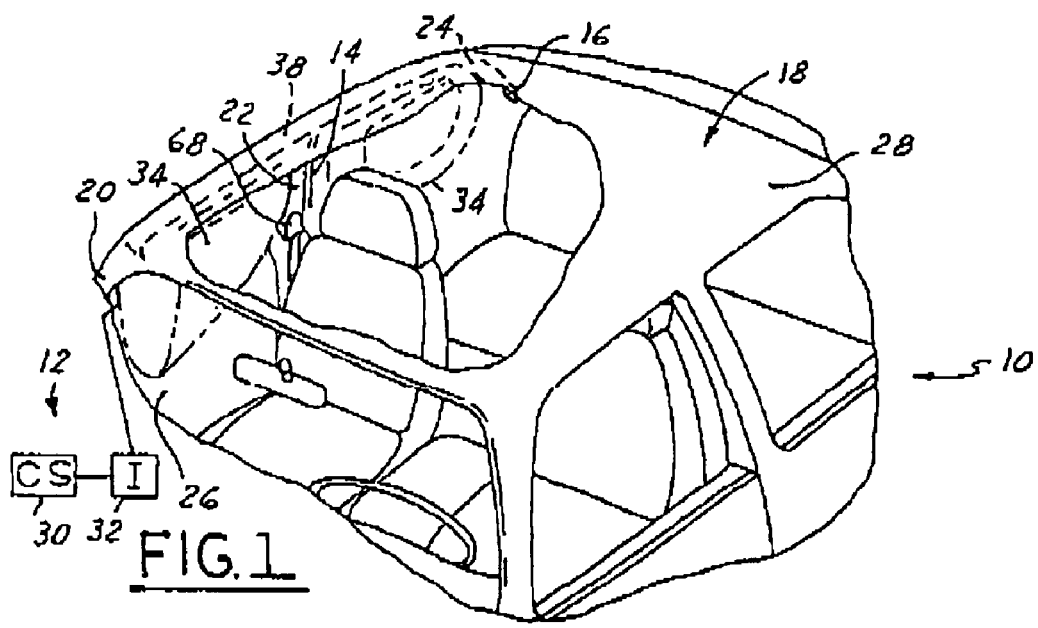
FIG. 1 is a perspective view of the interior of a vehicle having a side-curtain airbag system with a guiding pillar trim, according to one advantageous embodiment of the claimed invention.

In the following figures, the same reference numerals are used to identify the same components in the various views. Furthermore, the illustrated embodiments described herein employ features where the context permits. Specifically, the embodiments described herein implement a guiding pillar trim for directing downward deployment of a side-curtain airbag from a headliner of a vehicle roof. However, it is contemplated that the guiding trim can instead be utilized in a variety of other suitable environments. For instance, the guiding trim can be utilized for covering other vehicle body structures besides a pillar structure. In addition, the guiding trim can direct the deployment of various other airbags, e.g. a front airbag, in a variety of other directions as desired. In this way, other embodiments are contemplated having different combinations of the described features, having features other than those described herein, or lacking one or more of those features. For these reasons, it is understood that the invention can be carried out in a variety of suitable modes.

Referring to FIG. 1, there is shown a perspective view of a vehicle 10 having a side-curtain airbag system 12 with a guiding pillar trim 14, according to one advantageous embodiment of the claimed invention. The vehicle 10 generally includes a vehicle body 18, the side-curtain airbag system 12, and a headliner 16 for covering the side-curtain airbag system 12. The vehicle body 18 includes a first pillar 20, a second pillar 22, a third pillar 24, a door assembly 26, and a roof member 28. However, it will be appreciated that the vehicle body 18 can include more or less than three pillar structures as desired. The guiding pillar trim 14 is coupled to the second pillar 22 For covering the second pillar 22. As detailed below, the guiding pillar trim 14 is movable between a trim configuration (shown in FIGS. 2A and 4A) and a ramp configuration (shown in FIGS. 2B and 4B) for directing the deployment of a side-curtain airbag in a predetermined direction.

Specifically, the side-curtain airbag system 12 includes a crash sensor 30, an inflator device 32 coupled to and actuated by the crash sensor 30, a side-curtain airbag 34 coupled to and inflated by the side-curtain airbag 34, and a guiding pillar trim 14 for directing the deployment of the side-curtain airbag 34 in a predetermined direction. As respectively shown in FIGS. 2A and 2B, the system 12 is disposable between an undeployed state and a deployed state.

In this embodiment, the crash sensor 30 is a piezoelectric accelerometer for detecting a vehicle collision or roll-over incident. For instance, the piezoelectric accelerometer can detect a collision force typically associated with the vehicle crashing into a brick wall while traveling approximately ten to fifteen miles per hour. However, the crash sensor 30 can instead be utilized for detecting various other collision forces as desired. Also, it is understood that it will be appreciated that the crash sensor 30 can instead be a mechanical accelerometer or various other suitable sensors. Also in this embodiment, the inflator device 32 is a reactor that mixes sodium azide and potassium nitrate to quickly produce a blast of nitrogen gas for inflating the side-curtain airbag 34. However, it is contemplated that the inflator device 32 can be various other suitable inflation mechanisms as desired.

Figure 2A:
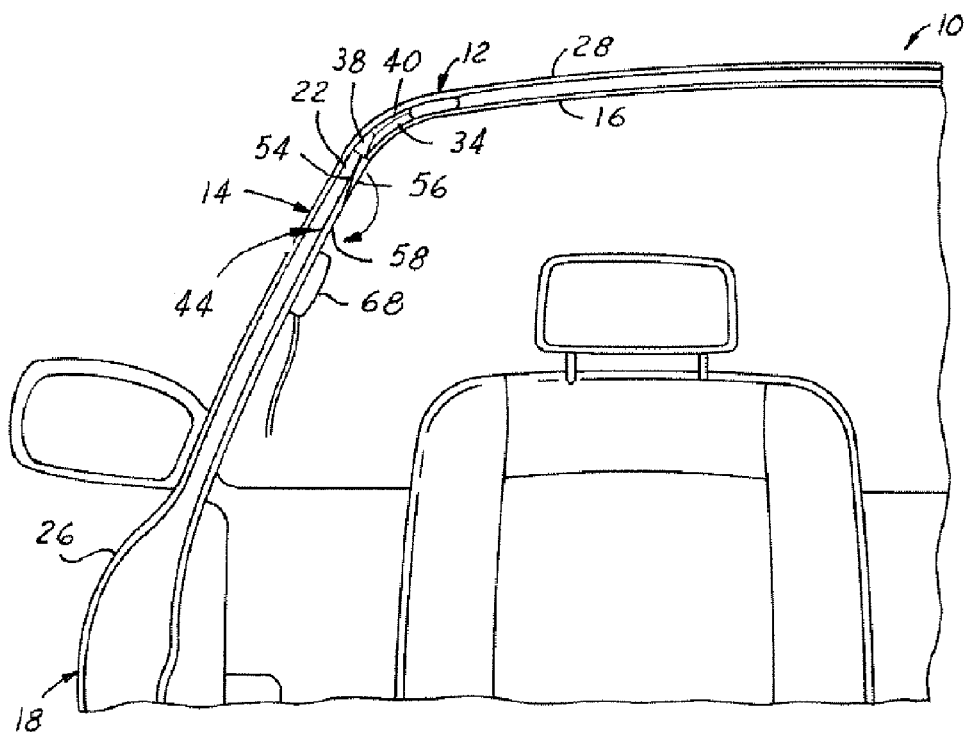
FIG. 2A is a cross-sectional view of the vehicle shown in FIG. 1, as taken along line 2-2, illustrating the guiding pillar trim in a trim configuration.

With particular attention to FIG. 2A, in this embodiment, the side-curtain airbag 34 is concealed above the headliner, stored in a folded position, and coupled to a roof rail 38. The side-curtain airbag 34 is sufficiently positioned for deploying in a generally downward direction and tearing a rip seam (not shown) in the headliner 16. In this embodiment, the system 12 includes a deflector 40 coupled to the roof rail 38 for directing the airbag 34 in the generally downward direction. However, it will be appreciated that the system can omit the deflector 40 as desired.

Figure 2B:
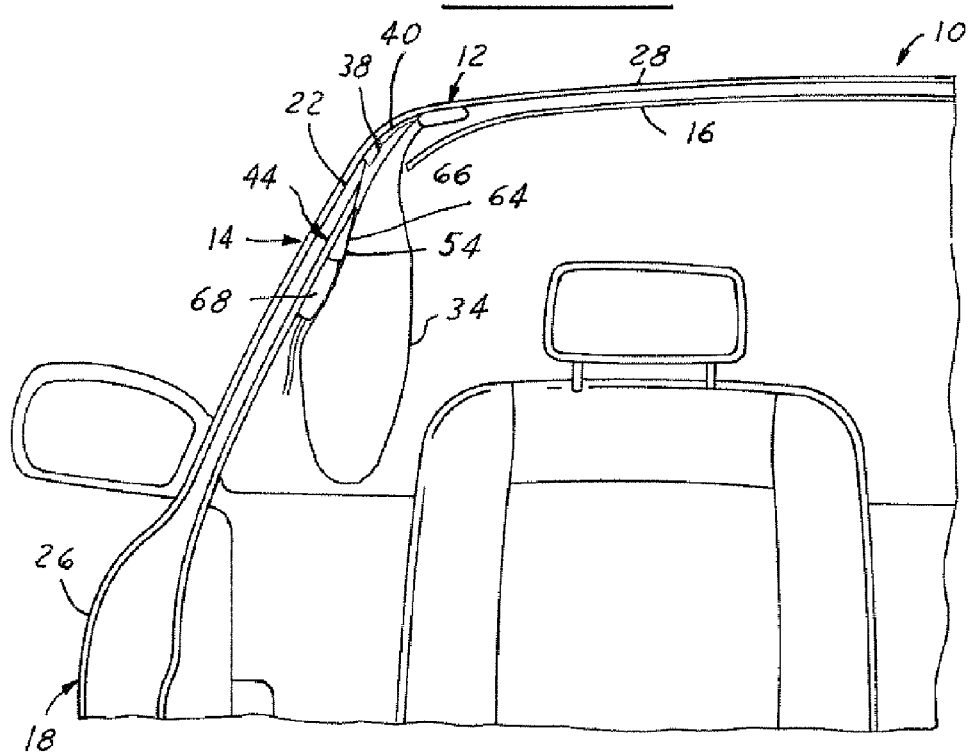
FIG. 2B is a cross-sectional view of the vehicle shown in FIG. 1, as taken along line 2-2, illustrating the guiding pillar trim in a ramp configuration for directing the deployment of a side curtain airbag in a predetermined direction.

As shown in FIG. 2B, the airbag 34 contacts the guiding pillar trim 14 and moves the guiding pillar trim 14 from a trim configuration to a ramp configuration. In this way, the actual deployment of the airbag 34 itself moves the guiding pillar trim 14 to the ramp configuration for directing the airbag in the predetermined direction. This feature is detailed in the description for FIGS. 4A and 4B.

Figure 3:
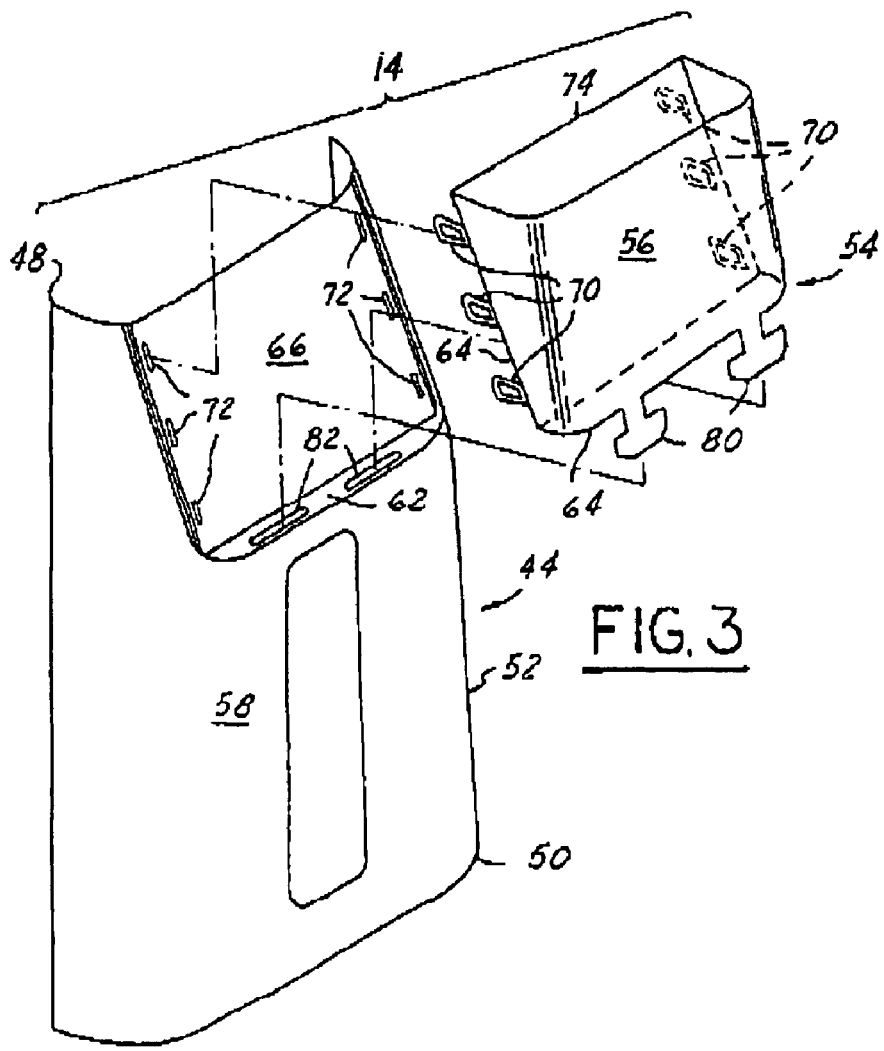
FIG. 3 is an exploded view of the guiding pillar trim shown in FIG. 1.

Referring now to FIG. 3, there is shown an exploded view of the guiding pillar trim 14 shown in FIG. 1, illustrating the construction of the guiding pillar trim 14 in one advantageous embodiment of the invention. The guiding pillar trim 14 includes a panel 44 for covering the second pillar 22 of the vehicle 10. However, as introduced hereinabove, the panel 44 can be utilized for covering the first pillar 20, the second pillar 22, or various other components of the vehicle body structure 18. This panel 44 has a top end portion 48, a lower end portion 50, and a middle portion 52 therebetween. The top end portion 48 of the panel 44 has a guide member 54 coupled thereto.

The guide member 54 is releasably attached to the top end portion 48 of the panel 44 and movable between the trim configuration (as shown in FIGS. 2A and 4A) and the ramp configuration (as shown in Figures (2B and 4B).

As best shown in FIG. 4A, in the trim configuration, the guide member 54 has a cosmetic surface 56 that is generally aligned with an inboard surface 58 of the panel 44. Specifically, the cosmetic surface 56 has a guide edge 60 that is substantially aligned with a panel edge 62 of the panel. In this way, the cosmetic surface 56 and the inboard surface 58 are aligned for providing a predetermined design to the second pillar 22. For example, in the trim configuration, the cosmetic surface 56 can be aligned with the inboard surface 58 for providing a continuous tubular pillar construction. However, it is contemplated that the surfaces 56, 58 can instead be aligned for providing a continuously tapering thickness to the overall pillar construction. This feature is beneficial for integrating the guide member 54 within the second pillar 22 and maximizing the available space within the passenger cabin. In addition, this feature substantially conceals the guide member 54 within the second pillar 22 and provides for a predetermined interior vehicle design. It is understood that the cosmetic surface 56 can be aligned with the inboard surface 58 in various other configurations as desired.

With reference now to FIG. 4B, in the ramp configuration, the guide member 54 has a routing surface 64 that is generally aligned with a deflecting surface 66 of the panel 44 for directing the deployment of the airbag 34 in the predetermined direction. In this embodiment, the routing surface 64 and the deflecting surface 66 are sufficiently aligned for directing the deployment of the airbag 34 away from a seatbelt mechanism 68, which is disposed adjacent to the middle portion 52 of the panel 44. This feature is beneficial for protecting the seatbelt mechanism from being damaged or otherwise hampered by the rapidly inflating airbag 34. Also, this feature can provide the airbag 34 with an unobstructed path for inflating within a substantially short period of time.

Referring back to FIG. 3, the guiding pillar trim 14 has a series of releasable anchors 70 extending therefrom for inserting into a series of apertures 72 formed within the panel 44. The releasable anchors are tabs with one or more resilient detent flanges for attaching to the panel 44. In this way, the guiding member 54 is secured in the trim configuration until sufficient force is applied to the guide member 54 for deforming the resilient detent flanges. However, it is understood that the releasable anchors 70 can instead have various other suitable constructions as desired. Also, the panel 44 can instead have the releasable anchors 70 extending therefrom with the guiding member 54 having the apertures 72 formed therein for receiving the releasable anchors 70. Additionally, it is also contemplated that more or less than six releasable anchors 70 and six apertures 72 can be utilized as desired.

The guide member 54 further includes a load-receiving portion 74 for contacting the inflating airbag 34 and moving the guide member 54 from the trim configuration to the ramp configuration. In this embodiment, the load-receiving portion 74 is a top edge of the guide member 54 that is disposed in the path of the inflating airbag 34. In this way, the airbag 34 contacts the load-receiving portion 74 with sufficient force to remove the releasable anchors 70 from the apertures 72 in the panel 44 and move the guide member 54 to the ramp configuration 76.

Moreover, the guide member 54 and the panel 44 have two tether members coupled therebetween for securing the guide member 54 in the ramp configuration as the airbag 34 after the airbag 34 has detached the releasable anchors 70 from the panel 44. In one embodiment, the tether members 80 extend from the guide member 54 for insertion into a hole 82 formed in the panel 44. However, it is understood that more or less than two tether members 80 can be utilized and also that the tether members 80 can instead extend from the panel 44 for insertion into the guide member 54 as desired. The tether members 80 can be sonic welded to the panel 44. It will be appreciated that the tether members 80 can instead be heat stakes with bosses or have various other suitable constructions as desired.

In another embodiment shown in FIG. 5, the guide member 54 and the panel 44 have a hinge element 84 coupled therebetween for moving the guide member 54 from the trim configuration to the ramp configuration. Also, in this embodiment, the guide member 54 and the panel 44 having a biasing member 86 coupled therebetween for biasing the guide member to the trim configuration. The force of the inflating airbag is sufficient for moving the guide member from the trim configuration to the ramp configuration.

While particular embodiments of the invention have been shown and described, numerous variations and alternate embodiments will occur to those skilled in the art. Accordingly, it is intended that the invention be limited only in terms of the appended claims.

What is claimed is:

1. A guiding pillar trim for a side-curtain airbag system of a vehicle, comprising:
   a panel member for covering a vehicle body structure; and
   a guide member coupled to said panel member;
   said guide member having a wedge shape;
   said guide member being rotatable upon inflation of an airbag system from a first trim configuration position forming a portion of said panel member to a second ramp configuration position;
   said guide member in said second position being supported by said panel member and forming a ramp configuration directing the deployment of an airbag from said airbag system in a predetermined direction;
   said guide member being releasably secured to said panel member by at least one anchor member, said anchor member releasably holding said guide member in said first position.

2. The guiding pillar trim recited in claim 1 wherein said anchor member is positioned on said guide member and said panel member has at least one aperture formed therein for receiving said at least one anchor member.

3. The guiding pillar trim recited in claim 1 wherein said anchor member is positioned on said panel member and said guide member has at least one aperture formed therein for mating with said anchor member.

4. The guiding pillar trim recited in claim 1 wherein said guide member is coupled to said panel member by at least one tether member extending from said guide member.

5. The guiding pillar trim recited in claim 4 wherein said panel member has at least one hole formed therein for mating with said tether member.

6. The guiding pillar trim recited in claim 1 wherein said guide member in said second position directs the deployment of a side-curtain airbag generally away from a seatbelt mechanism.

7. The guiding pillar trim recited in claim 6 wherein said guide member is coupled to a top end portion of said panel member, said seatbelt mechanism being generally disposed adjacent at least one of a middle portion and a bottom end portion of said panel member.

8. The guiding pillar trim recited in claim 1 wherein said panel member has a deflecting surface and said guide member has a routing surface, said deflecting surface and said routing surface positioned to direct the deployment of said side-curtain airbag in said predetermined direction when said guide member is in said second position.

9. The guiding pillar trim recited in claim 1 wherein said guide member has a load-receiving portion for receiving a load from a side-curtain airbag and moving said guide member to said second position.

10. A side-curtain airbag system for a vehicle comprising:
    a crash sensor for detecting a vehicle crash;
    an inflator device coupled to and actuated by said crash sensor;
    a side-curtain airbag coupled to and inflated by said inflator device; and
    a guiding pillar trim member including a panel member for covering a body structure and a guide member coupled to said panel member, said guide member being movable between a trim configuration and a ramp configuration, said guide member in said ramp configuration for directing said side-curtain airbag in a predetermined direction; and
    a biasing member coupled between said guide member and said panel member;
    said biasing member for biasing said guide member in said trim configuration;
    said guiding pillar trim member including at least one tether member coupled between said panel member and said guide member for securing said guide member in said ramp configuration.

11. The side-curtain airbag system recited in claim 10 wherein said panel member has at least one aperture formed therein for receiving at least one releasable anchor extending from said guide member so as to secure said guide member in said trim configuration.

12. The side-curtain airbag system recited in claim 10 wherein said guide member has at least one aperture formed therein for receiving at least one releasable anchor extending from said panel member so as to secure said guide member in said trim configuration.

13. A guiding pillar trim member for a side-curtain airbag system of a vehicle comprising:
    a panel member for covering a vehicle body structure; and
    a guide member coupled to said panel member and being movable between a trim configuration position and a ramp configuration position;
    said guide member having a wedge shape;
    said guide member in said ramp configuration position being supported by said panel member and directing the deployment of a side-curtain airbag in a predetermined direction;
    said guide member having at least one tether member extending therefrom for attaching to said panel member and securing said guide member to said panel member.

14. The guiding pillar trim member recited in claim 13 wherein said panel member has at least one hole formed therein for receiving said tether member.

15. The guiding pillar trim member recited in claim 13 wherein said panel member has a deflecting surface and said guide member has a routing surface, with said deflecting surface and said routing surface directing the deployment of said side-curtain airbag in said predetermined direction when said guide member is in said ramp configuration.

* * * * *